Dec. 30, 1924.
J. R. GAMMETER
GROOVING MACHINE
Filed Sept. 30, 1922
1,521,238
2 Sheets-Sheet 1
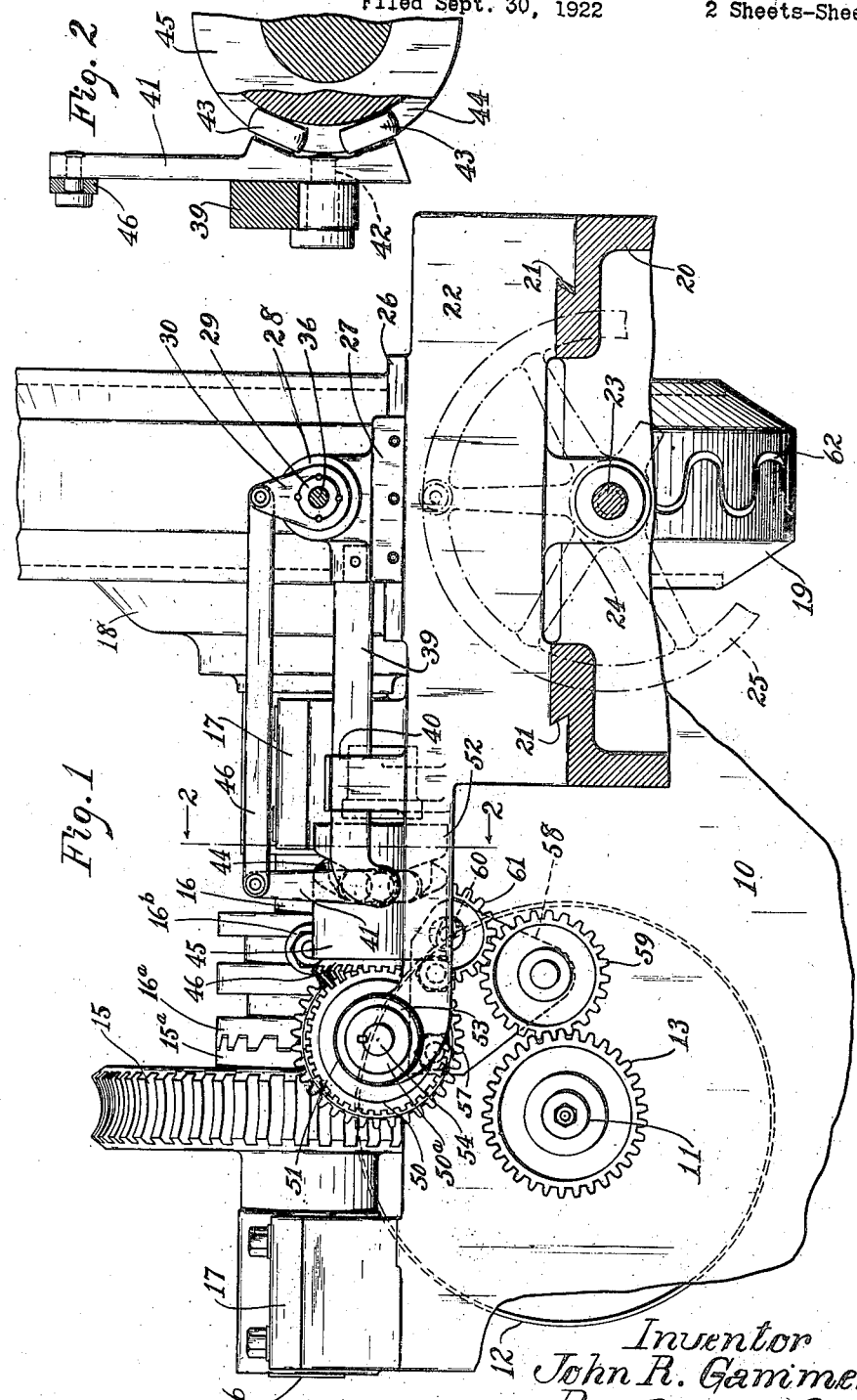
Inventor
John R. Gammeter.
By Robert McPierson
Atty.

Dec. 30, 1924.

J. R. GAMMETER

GROOVING MACHINE

Filed Sept. 30, 1922

Inventor
John R. Gammeter.
By Robert M Pierson
Atty.

Patented Dec. 30, 1924.

1,521,238

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

GROOVING MACHINE.

Application filed September 30, 1922. Serial No. 591,587.

*To all whom it may concern:*

Be it known that I, JOHN R. GAMMETER, a citizen of the United States, residing at Akron, in the county of Summit and State of Ohio, have invented a certain new and useful Grooving Machine, of which the following is a specification.

This invention relates to apparatus for cutting a sinuous peripheral groove in an article such as the tread portion of an unvulcanized solid vehicle tire.

Special applicability of my invention to the grooving of tires arises from the fact that such tires after being grooved, are vulcanized in molds which are provided with segmental tread rings formed with sinuous raised portions corresponding to the groove in the tire, the segments of said rings having their outer faces tapered and being adapted to be forced radially inward into the tire by means of a circumscribing wedging ring having a complemental tapered inner periphery, said wedging ring being forced down into the same plane as the tread ring segments by the closing of the mold members. By grooving the unvulcanized tire I am able to give the tread ring segments a substantial initial penetration into the tire, thus permitting the circumscribing wedging ring more nearly to assume its final or seating position, and thereby allowing the mold halves more nearly to close before being put under pressure in the vulcanizer, so as to include more of them in the vulcanizer at each heat.

My object is to provide an improved method and improved apparatus of simple construction for grooving circular articles such as solid tires, and apparatus which may be easily and quickly adapted to accommodate tires or articles of different diameters.

Of the accompanying drawings:

Fig. 1 is a side elevation, partly in section, of a preferred form of my apparatus.
Fig. 2 is a fragmentary section on the line 2—2 of Fig. 1.

Figure 3:
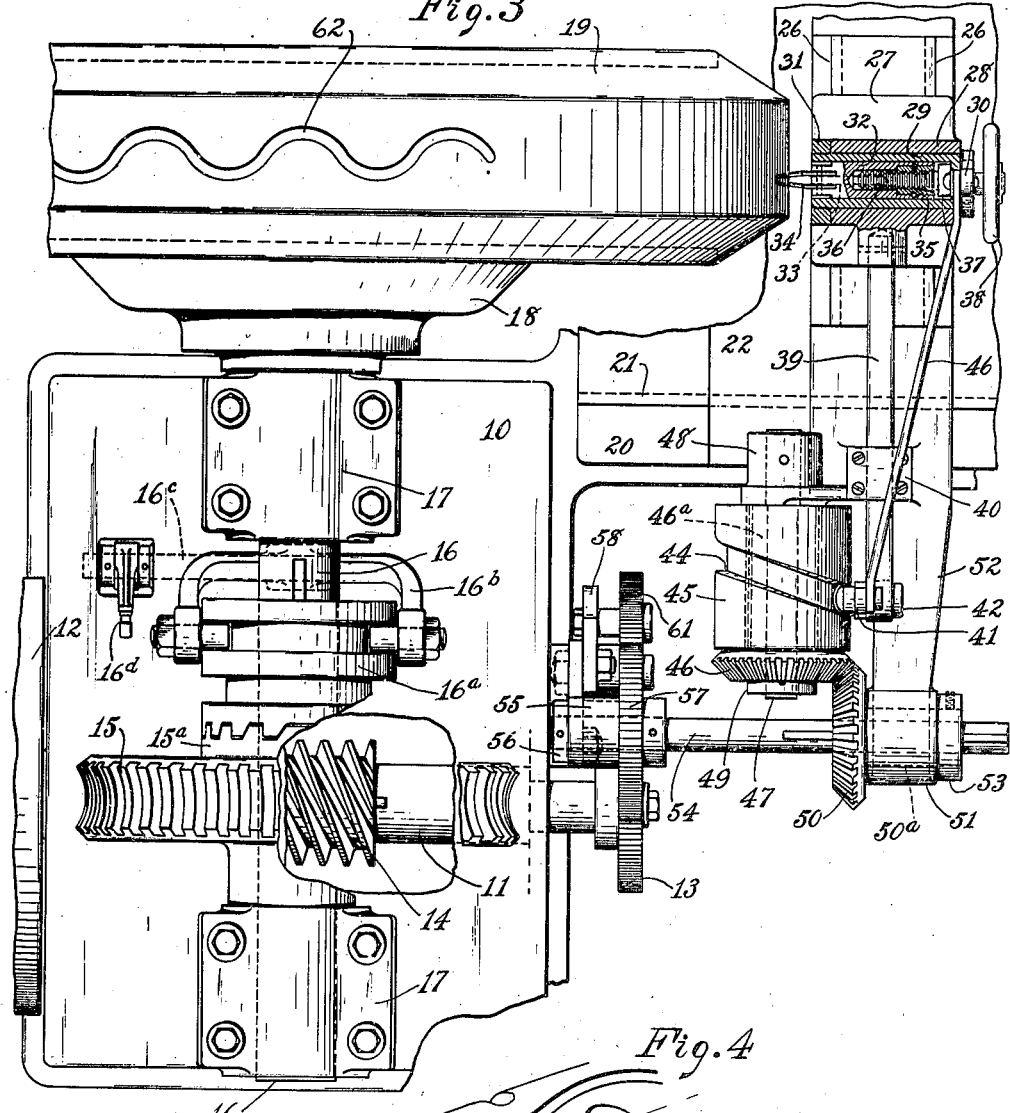
Fig. 3 is a plan view, with parts broken away and in section, of the apparatus shown in Fig. 1.

Referring to the drawings, 10 represents generally an upright supporting frame in which is journaled a shaft 11 provided at one of its ends with a pulley 12 adapted to be belt driven from a suitable source of power, and having its opposite end provided with a spur gear 13 for purposes to be hereinafter described. Keyed to the shaft 11 at a point intermediate its ends is a worm 14 which meshes with a worm gear 15 loosely journaled on a transverse overhead shaft 16 journaled in bearing brackets 17, 17 on the top of the frame 10. One face of the worm gear 15 is formed with a concentric, toothed clutch member 15$^a$, and a complemental clutch member 16$^a$, slidably keyed on the shaft 16, is adapted to be thrown into engagement therewith by means of a forked shipper lever 16$^b$ provided with studs mounted in an annular groove in said member 16$^a$, said lever being secured to a rock-shaft 16$^c$ journaled in the frame 10 and adapted to be operated by a hand lever 16$^d$ projecting upward therefrom through an opening in the top member of the frame 10 (Fig. 3). One end of the shaft 16 projects beyond its journal bracket 17 and supports a chuck 18 adapted to engage the base of a solid tire 19.

The frame 10 is provided with a lateral extension 20 having on its upper face a pair of dove-tail slide-guides 21 upon which is mounted a carriage 22 adjustable toward and away from the tire by means of a screw 23 journaled in the frame extension 20 and threaded through a downwardly projecting ear 24 on said carriage, said screw being adapted to be manually rotated by means of a hand wheel 25 secured to its outer end. The top face of the carriage 22 is provided with a pair of dove-tail slide-guides 26 extending transversely of the slide-guides 21, and on it is slidably mounted a tool carriage 27 having a journal bracket 28 formed on its upper face, the journal axis of said bracket being radial with relation to the tire 19. Loosely journaled in the bracket 28 is a bushing 29 which has a lever 30 secured to one of its ends, and has its opposite end provided with a collar 31 threaded thereon, said lever and collar serving to retain said bushing within the bracket 28. A tool holder 32 is slidably mounted within the bushing 29 and prevented from rotating therein by means of a key 33. The end of the tool holder nearest the tire is provided with a U-shaped knife 34, the base of the U projecting in the direction of said tire and having its cutting edge uppermost. The other end of the tool holder 32 terminates within the bushing, and is formed with a counter-bore in which is secured a nut 35, through which is threaded an axial screw 36, said screw being formed with a stop flange 37 abutting an inwardly extending flange on the bushing 29, the stem of said screw projecting from the bushing 29, and being provided with a handwheel 38 by which it may be manually rotated to move the knife 34 toward or away from the tire.

Projecting from the tool carriage 27, to the left as viewed in Fig. 1, is a pitman 39 slidably mounted in a guide-bracket 40 on the carriage 22, said pitman having a cam lever 41 pivoted in its free end at 42. The cam-lever 41 is provided with a pair of rollers 43, 43 (see Fig. 2) one at each side of its pivot or fulcrum 42, said rollers being mounted in a continuous groove 44 in a rotary cam member 45. Thus the cam member is adapted to impart a reciprocating movement to the tool slide 27, and also to impart an oscillating movement to the cam lever 41. A link 46 connecting the free end of the lever 30 with the free end of the cam lever 41 is adapted to impart said movement to the tool holder 32.

The cam member 45 is keyed to an elongated hub 46ᵃ of a bevel gear 46, said bevel gear being loosely journaled on a spindle 47 which is secured at one of its ends in a bracket 48 on the carriage 22, the cam member and gear being retained on said spindle by a stop collar 49 on the free end of the latter. The bevel gear 46 is meshed with a bevel gear 50 which has an elongated hub 50ᵃ loosely journaled in a bearing 51 formed in the end of an arm 52 extending laterally from the carriage 22, said gear 50 being retained in said bearing bracket 51 by a collar 53 secured on the end of its hub.

Slidably keyed in the hub 50ᵃ is a driving shaft 54, the opposite end of which is journaled in a bracket 55 mounted on the side of the frame 10, and held against longitudinal movement therein by means of a stop collar 56 and a spur gear 57 secured on said shaft on opposite sides of said bracket. Secured to the bracket 55 is a change-gear supporting-plate 58 upon which is journaled an idler pinion 59 meshed with the aforementioned spur gear 13, said plate 58 also having an arcuate slot 60 concentric with the axis of the pinion 59, in which slot is adjustably journaled an idler pinion 61 meshed with the idler pinion 59 and with the spur gear 57, the two idler pinions being necessary to obtain the proper direction of rotation in the associated parts.

Figure 4:
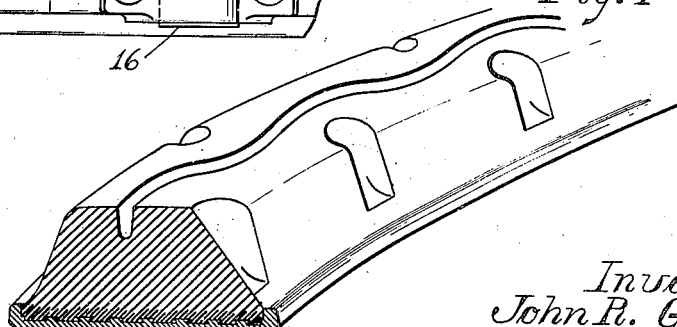
Fig. 4 is a sectional perspective view of part of a tire grooved by my apparatus, and thereafter vulcanized.

In operation, an unvulcanized solid tire 19 is mounted upon the chuck 18, the knife 34 at this time being in a retracted position out of engagement with the tire, although the cam member 45 may be rotating and its associated parts functioning. The hand lever 16ᵈ is then thrown into the position shown in Fig. 3 to engage the clutch members 15ᵃ, 16ᵃ and cause the tire to rotate, after which the handwheel 38 is rotated to feed the knife 34 forward against the tire to cut the groove therein, said groove being shown at 62. Said forward feeding movement of the knife is continued through several revolutions of the tire, or until it has penetrated to the desired depth. The reciprocating movement of the tool slide 27, together with the rotation of the tire, causes the groove 62 to be cut in a sinuous or wavy form, and the coordinated, oscillating movement of the tool holder 32 causes the knife always to adapt its angular position to the sinuous course of the groove 62. After the tire is grooved, it is placed in a mold and vulcanized as heretofore described, the finished tire being shown in Fig. 4.

When it is desired to change the machine to operate upon a tire of different diameter it is necessary only to rotate the handwheel 25 to move the carriage 22, and parts carried thereon a proper distance from the chuck 18 and to substitute for the spur gear 57 a gear with the proper number of teeth to regulate the speed of the cam so that the sinuous groove 62 will be continuous and of the desired pitch, the adjustable feature of the pinion 61 making this possible.

While I do not wholly limit myself to the use of a U-shaped knife, a knife of such form has the advantage that the material gouged from the tire passes through the knife and is disposed of below so that it does not interfere with the cutting operation.

Modifications may be resorted to without departing from the scope of my invention, and I do not wholly limit my claims to the specific construction shown.

I claim:

1. In a machine of the character described, the combination of means for supporting and rotating an article, a knife adapted to be brought into cutting relation to said article as the latter is rotated, means for supporting said knife and moving it toward and away from said article, and means for imparting to the knife a plurality of to-and-fro reciprocatory movements during each rotation of the article.

2. In a machine of the character described, the combination of means for supporting and rotating a circular article, a knife disposed radially with relation to said article, means for advancing or retracting said knife, means for oscillating said knife, and means for imparting to said knife a plurality of to-and-fro reciprocatory movements in a direction substantially parallel to the axis of rotation of the article.

3. In a machine of the character described, the combination of a rotatable tire-supporting chuck, a knife adapted to operate upon a tire mounted on said chuck, means for advancing or retracting said knife, means for imparting a relatively rapid to-and-fro movement to said knife, and means for oscillating said knife, upon an axis substantially radial with relation to said chuck, in determinate relation to the reciprocation thereof.

4. In a tire-grooving machine the combination of a rotatable, tire-supporting chuck, a knife adapted to operate upon a tire mounted on said chuck, a feed screw for moving said knife toward the work, and common means for so reciprocating and oscillating said knife as to cause it to follow a sinuous course with relation to the work.

5. In a tire grooving machine, the combination of a rotatable, tire-supporting chuck, a knife adapted to gouge a groove in a tire mounted on said chuck, means for progressively forcing said knife into said tire, and means for manipulating said knife with relation to the rotation of said tire so as to cut an endless, sinuous groove therein.

6. In a tire grooving machine, the combination of a rotatable, tire supporting chuck, a U shaped knife adapted to gouge a groove in a tire mounted on said chuck, said knife being adjustable radially with relation to the tire, and means for laterally reciprocating and oscillating said knife so as to cut a groove of sinuous form in said tire.

7. In a tire grooving machine, the combination of means for supporting and rotating a tire, a knife adapted to gouge a groove in said tire as the latter is rotated, and means for laterally reciprocating said knife to give said groove a sinuous form, said knife and its actuating means being adjustable as a unit toward and from said chuck, to adapt the machine for tires of different sizes.

8. In a tire grooving machine, the combination of a rotable, tire-supporting chuck, a tool support slidably mounted for movement parallel to the axis of said chuck, a retractable knife mounted on said tool support, a reciprocating bar secured at one of its ends to said tool support, a lever pivoted on the other end of said rod, a cam member, means on said lever, at each side of its pivot, adapted to be actuated by said cam-member to reciprocate said tool support and oscillate said lever, and a link operatively connecting said lever with said knife to oscillate the latter upon an axis substantially radial with relation to said chuck.

9. In a tire-grooving machine, the combination of means for supporting and rotating the tire, a knife adapted to gouge a groove in the tread of said tire as the latter is rotated, and means for moving said knife laterally with relation to the tread of the tire so as to cause it to cut a sinuous groove, the tire-rotating means and the knife-moving means being operatively connected in such speed ratio as to cause said knife to return to its starting point on the tread of the tire.

10. In a tire grooving machine, the combination of a rotatable tire-supporting means adaptable for tires of different sizes, driving means therefor, a shaft adapted to be driven from said driving means at different relative speeds, a slide adapted to be adjusted from and toward said tire-supporting means in a radial direction with relation to a tire supported thereon, a knife carried by said slide and adapted to gouge a groove in the tread of said tire, and means on said slide, adapted to be driven by said shaft, for moving said knife laterally with relation to the tread of the tire and in determinate but variable relation to the speed of said tire supporting means.

11. In a tire grooving machine the combination of a rotatable tire-supporting means adaptable for tires of different sizes, driving means therefor, a shaft adapted to be driven from said driving means at different relative speeds, a slide adapted to be adjusted from and toward said tire supporting means, in a radial direction with relation to a tire supported thereon, a knife carried by said slide and adapted to gouge a groove in the tread of said tire, and means on said slide, adapted to be driven by said driving member, for moving said knife laterally with relation to the tread of the tire and in determinate but variable relation to the speed of said tire supporting means.

In witness whereof I have hereunto set my hand this 27 day of September. 1922.

JOHN R. GAMMETER.